United States Patent
Wang et al.

(10) Patent No.: US 11,915,631 B2
(45) Date of Patent: *Feb. 27, 2024

(54) DIGITAL-DISPLAY CONTROL APPARATUS FOR GARBAGE CAN WITH ADJUSTABLE SENSING DISTANCE

(71) Applicants: Nine Stars Group (U.S.A.) Inc., Ontario, CA (US); Fujian Nashida Electronic Incorporated Company, Fuzhou (CN)

(72) Inventors: Xin Wang, Fuzhou (CN); Jiangqun Chen, Fuzhou (CN); Zhou Lin, Fuzhou (CN)

(73) Assignees: Nine Stars Group (U.S.A.) Inc., Ontario, CA (US); Fujian Nashida Electronic Incorporated Company, Fujian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/251,733

(22) PCT Filed: Aug. 24, 2018

(86) PCT No.: PCT/CN2018/102262
§ 371 (c)(1),
(2) Date: Dec. 11, 2020

(87) PCT Pub. No.: WO2019/237510
PCT Pub. Date: Dec. 19, 2019

(65) Prior Publication Data
US 2021/0150955 A1 May 20, 2021

(30) Foreign Application Priority Data

Jun. 11, 2018 (CN) .......................... 201820896714.9

(51) Int. Cl.
*G09G 3/14* (2006.01)
*B65F 1/16* (2006.01)
(Continued)

(52) U.S. Cl.
CPC ............. *G09G 3/14* (2013.01); *B65F 1/1638* (2013.01); *G01S 17/10* (2013.01); *G05B 19/042* (2013.01);
(Continued)

(58) Field of Classification Search
CPC .. B65F 1/00; B65F 1/14; B65F 1/1638; B65F 2210/168; B65F 1/1607; G01S 17/10;
(Continued)

(56) References Cited

U.S. PATENT DOCUMENTS

2008/0264942 A1* 10/2008 Shek ...................... B65F 1/1607
220/230
2014/0184110 A1* 7/2014 Wang ........................ H02P 3/10
220/495.08
(Continued)

FOREIGN PATENT DOCUMENTS

CN  107032021 A  * 8/2017 ............ B65F 1/1638
CN  207329412 U  * 5/2018

*Primary Examiner* — Richard J Hong
(74) *Attorney, Agent, or Firm* — David & Raymond Patent Firm; Raymond Y. Chan

(57) ABSTRACT

A digital-display control apparatus of a garbage can with adjustable sensing distance includes an emitter, a receiver, amplifier, an analog to digital converter, an analog to digital conversion result register connected to the receiver via the amplifier and the analog to digital convertor, a comparison unit, a sensing distance adjustable register, a microcomputer control unit, a drive circuit, and a digital displayer and keys, which is capable of selecting the sensing distance by directly pressing keys or choose the predetermined sensing distance.

19 Claims, 2 Drawing Sheets

(51) Int. Cl.
  *G01S 17/10*     (2020.01)
  *G05B 19/042*    (2006.01)
  *G06F 3/02*      (2006.01)

(52) U.S. Cl.
  CPC .......... *G06F 3/02* (2013.01); *B65F 2210/168* (2013.01); *G05B 2219/21137* (2013.01); *G05B 2219/25257* (2013.01)

(58) Field of Classification Search
  CPC ........ G05B 19/042; G05B 2219/21137; G05B 2219/25257; G06F 3/02; G09G 2354/00; G09G 3/04; G09G 3/14; G08B 13/08; H02P 3/10
  See application file for complete search history.

(56) References Cited

U.S. PATENT DOCUMENTS

| | | | |
|---|---|---|---|
| 2016/0347540 A1* | 12/2016 | Skocypec | G08B 13/08 |
| 2017/0090447 A1* | 3/2017 | Skocypec | B65F 1/1426 |
| 2017/0096299 A1* | 4/2017 | Yang | G01J 1/4204 |
| 2018/0229930 A1* | 8/2018 | Shek | B65F 1/1638 |
| 2020/0062499 A1* | 2/2020 | Wang | G05B 19/042 |

* cited by examiner

DIGITAL-DISPLAY CONTROL APPARATUS FOR GARBAGE CAN WITH ADJUSTABLE SENSING DISTANCE

BACKGROUND OF THE PRESENT INVENTION

Field of Invention

The present invention relates to household garbage container, and more particularly to a digital-display control apparatus of a garbage can with adjustable sensing distance.

Description of Related Arts

For the conventional garbage can with infrared sensing, the sensing distance is commonly unadjustable. When the distance between the obstacle and the sensing window is greater than the critical sensing distance, the cover is not operated to open. When the distance between the obstacle and the sensing window is less than the critical sensing distance, the cover is operated to open. It is commonly called critical sensing distance as a threshold in the field or sensing distance for short. At present, the infrared sensing garbage can on the market generally has a sensing distance of about 25 cm in the hand test. In some situations, some people in standing posture (hoping to have a higher sensing distance without needs to bend), and some people in sitting posture (hoping to have a moderate sensing distance) use the garbage can. Some people place the sensing garbage can under the countertop (hoping to set a lower sensing distance which is not easy to cause operation). Due to the different requirements for personalized use, the single and fixed sensing distance is no longer popular the market. According to a prior art Chinese patent entitled: Garbage Can With Preset Sensing Distance And Control Method Thereof (application number: 201710309082.1), it provides a technical solution for adjusting the sensing distance. However, the adjustment of the sensing distance needs to be done by pressing the key while sensing by the hand. The adjustment operation is very inconvenient, and it is easily affected by the hand shaking and the external environment. The adjustment distance can not be observed for user, and the user cannot easily know the current sensing distance during adjusting.

SUMMARY OF THE PRESENT INVENTION

The invention is advantageous in that it provides a digital-display control apparatus for garbage can with adjustable sensing distance, which can simply and quickly adjust the sensing distance according to individual requirement and can be observed to operate.

According to the present invention, the foregoing and other objects and advantages are attained by a digital-display control apparatus for garbage can with adjustable sensing distance, comprising an emitter, a receiver, amplifier, an analog to digital converter, an analog to digital conversion result register, a comparison unit, an adjustable sensing distance register, a microcomputer control unit and a drive circuit, wherein the receiver is connected to the analog to digital conversion result register via the amplifier and the analog to digital converter, wherein the outputs of the analog to digital conversion result register and the adjustable sensing distance register are respectively connected to the comparison unit, wherein one output of the microcomputer control unit is connected to the drive circuit, wherein control ports of the microcomputer control unit are respectively connected with the analog to digital conversion result register, the comparison unit, the adjustable sensing distance register and the emitter. The digital-display control apparatus further comprises a digital displayer and at least a key. The input of the key is connected with the microcomputer control unit. One output of the microcomputer control unit is connected to the digital displayer, wherein the signal input by the key is processed by the microcomputer control unit, and a sensing distance value is obtained as the register value of the adjustable sensing distance register, and the sensing distance value or a digital information representing the sensing distance value is output to the digital displayer by the microcomputer control unit for display.

In one embodiment, the key can be further embodied as:

The key is a digital input key, which can directly input a value, which is converted and processed by the microcomputer control unit, and then stored in the adjustable sensing distance register.

In one embodiment, the key is a selection input key. The adjustable sensing distance register comprises a plurality of storage units for storing predetermined distance value. Or the microcomputer control unit is stored with a plurality of predetermined distance value. While operating the key, the corresponding sensing distance can be selected by the corresponding content or the times of keystrokes, so that the set storage unit of the adjustable sensing distance register is selected as the current reference register, or the microcomputer control unit sends the selected sensing distance to be stored in the adjustable sensing distance register.

In one embodiment, the key is a number key, each number key represents a selected value (select the predetermined sensing distance). When the key is a single key, the selection is made according to the keystrokes. In the case of the initial value, with each time pressing on the key, the selected value of the predetermined sensing distance is selected progressively, and after the last selected value is reached, the selected value s returned to the first value. The predetermined sensing distance value stored in the adjustable sensing distance register or the microcomputer control unit corresponds to the key content or the keystrokes.

The digital displayer can display the value of the current sensing distance, or the representative number of the sensing distance. For example, the representative number of 10 cm is 1. In this embodiment, each operation of the key will cause the digital displayer to display the corresponding number, so the adjustment operation is simple, convenient, and fast, without external influence, which can be operated with single hand, and the user can visually know the current sensing distance via the digital displayer without adversely affect, so as to meet the individual needs of the market.

In one embodiment, the digital-display control apparatus of garbage can with adjustable sensing distance comprises: an analog to digital converter, an analog to digital conversion result register, an adjustable sensing distance adjustable register, a comparison unit and a microcomputer control unit integrated in one microcomputer control chip, wherein the microcomputer control chip comprises a first port 4A, a second port 4B, a third port 4C, a fourth port 4D, and a fifth port 4E, wherein the first port 4A is connected to the emitter, the second port 4B is connected to the output of the amplifier, the third port 4C is connected to the digital displayer, the fourth port 4D is connected to the drive circuit, and the fifth port 4E is connected to the key.

In one embodiment, the emitter is an infrared emitter and the receiver is an infrared receiver.

The analog to digital conversion result register receives the actual distance currently sensed. The comparison unit compares the actual distance with the predetermined value in the adjustable sensing distance register. When the predetermined conditions are triggered, the comparison unit sends the signal via the microcomputer control unit to the drive circuit, and the drive circuit is connected to the The digital displayer is a number display, displaying numbers of 1 to N, wherein 2≤N≤9.

By Pressing the key to display the current sensing distance, and then each time pressing the key, the digital displayer displays the number after plus 1. When the highest sensing distance is reached at N, pressing the key again to return to level 1, which is repeated the above cycle. The number 1 representing that the sensing distance is 10 cm; the number 2 representing that the sensing distance is 20 cm; the number 3 representing that the sensing distance is 30 cm; the number 4 representing that the sensing distance is 40 cm; the numbers 5 representing that the sensing distance is 50 cm; the number 6 representing that sensing distance is 60 cm; the number 7 representing that sensing distance is 70 cm; the number 8 representing that sensing distance is 80 cm; the number 9 representing that sensing distance is 90 cm. They are displayed in the digital displayer installed under the sensor window.

As above, the invention is advantageous in that it provides a digital-display control apparatus of a garbage can with adjustable sensing distance, which is capable of selecting the sensing distance by directly pressing keys or choosing the predetermined sensing distance. With showing the current sensing distance via the digital displayer, the user can adjust the sensing distance according own needs and the requirements of the use environment. The adjustment operation is simple, convenient, and fast, without external influence, which can be operated with single hand, and that the user can visually know the current sensing distance via the digital displayer without adversely affect, so as to meet the individual needs of the market.

1-infrared emitter, 2-infrared receiver, 3-amplifier, 4-microcomputer control chip, 41-analog to digital converter, 42-analog to digital conversion result register, 43-comparison unit, 44-adjustable sensing distance register, 45-microcomputer control unit, 4A-output control port of the microcomputer control chip controlling the infrared emitter transmitting infrared pulse, 4B-analog signal input of analog to digital converter, 4C-output of microcomputer control chip lighting digital displayer, 4D-output units of drive circuit of the microcomputer control chip, 4E-input of the microcomputer control chip connected with the key, 5-digital displayer, 6-key, 7-drive circuit, 8-motor, 9-reducer, 10-over, 11-sensing window, 12-sensing area.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
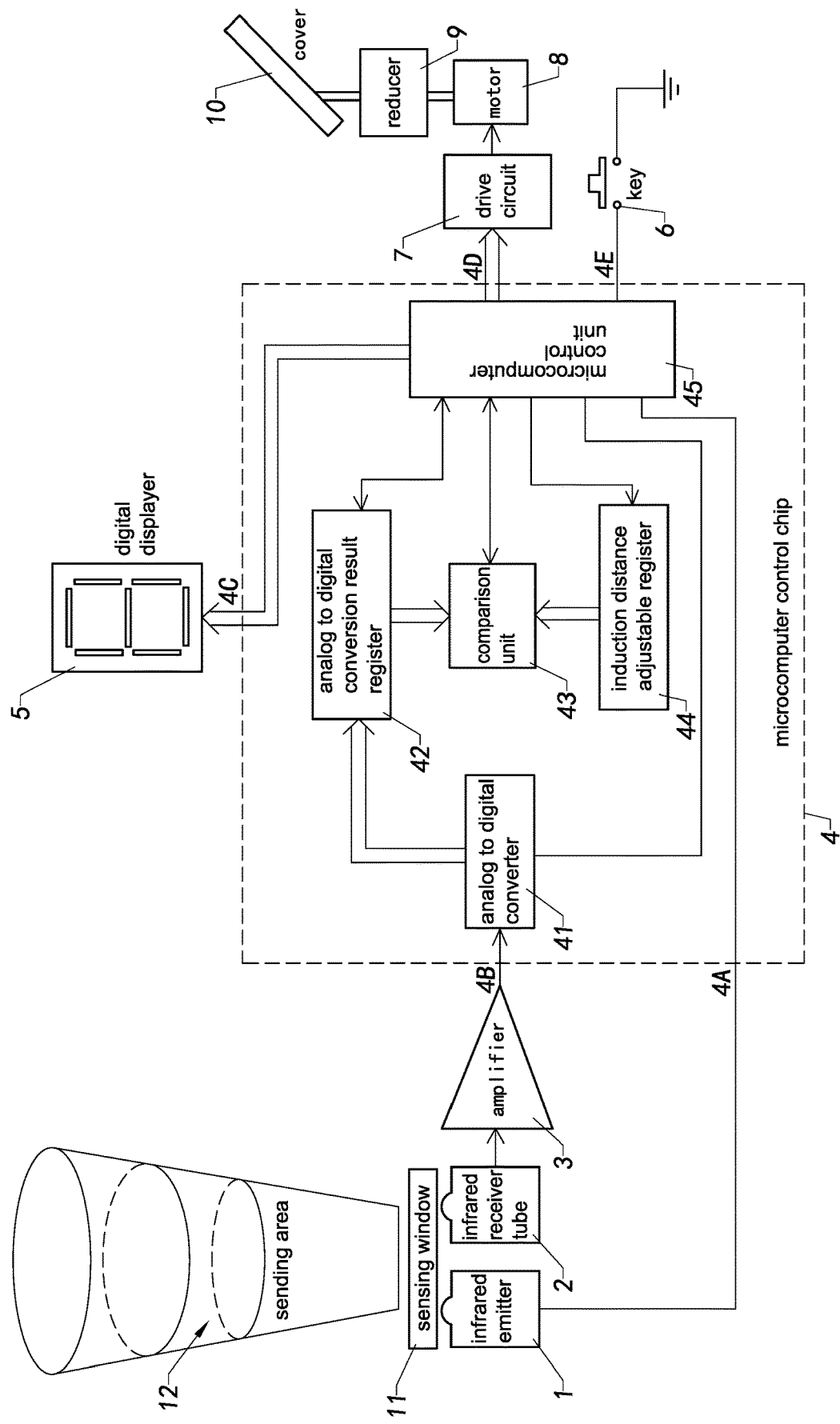
FIG. 1 is an electrical block diagram of a digital-display control apparatus of a garbage can with adjustable sensing distance according to a preferred embodiment of the present invention.
Figure 2:
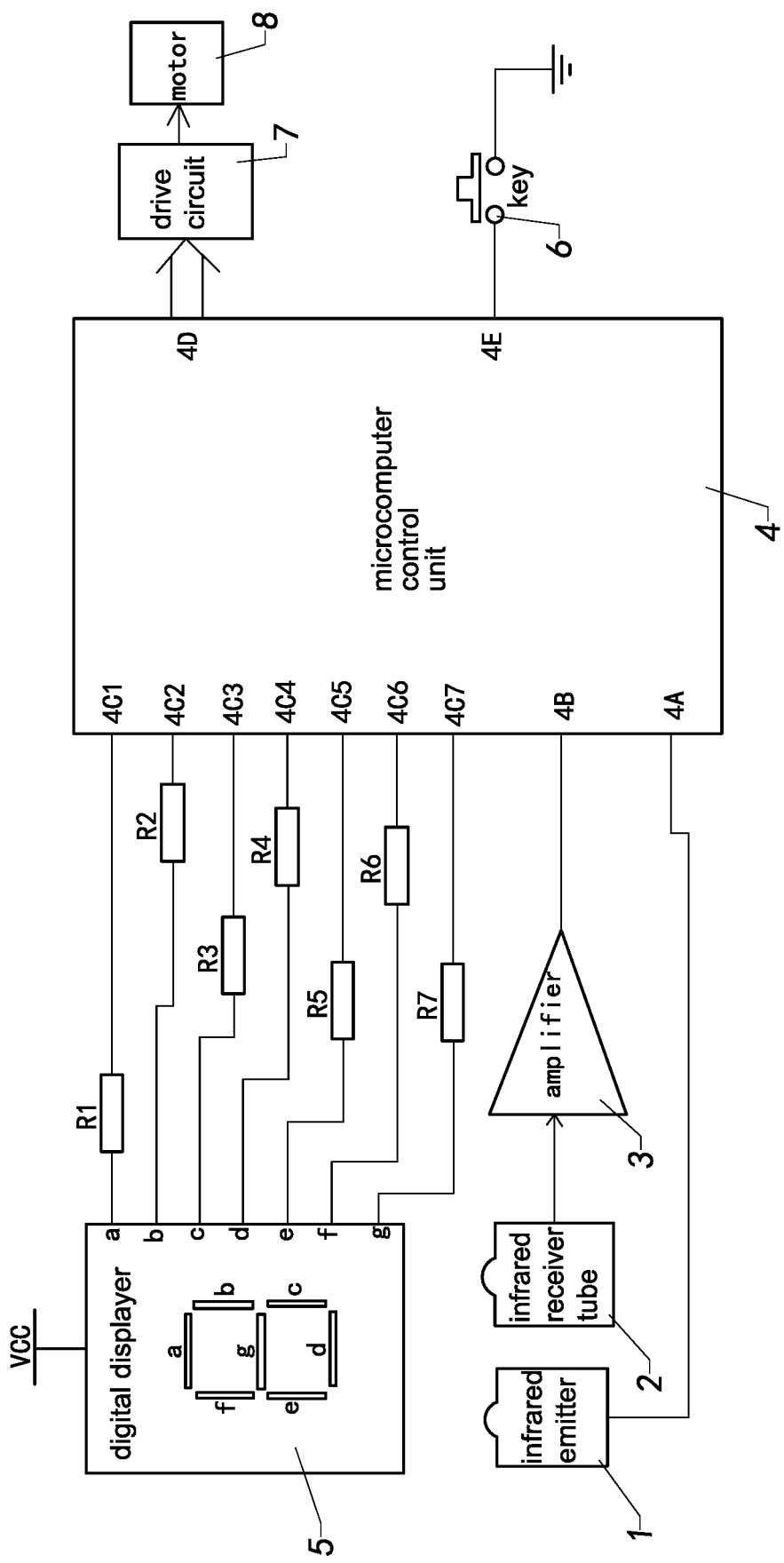
FIG. 2 is an electrical block diagram of a digital-display control apparatus of a garbage can with adjustable sensing distance according to a preferred embodiment of the present invention, illustrating the connection between the digital displayer and the microcomputer control chip.

Referring to FIG. 1 and FIG. 2, a digital-display control apparatus of a garbage can with adjustable sensing distance comprises an infrared emitter 1, an infrared receiver 2, an amplifier 3, a microcomputer control chip 4, an analog to digital converter 41, an analog to digital conversion result register 42, an adjustable sensing distance register 44, a comparison unit 43, a microcomputer control unit 45, a digital displayer 5, a key 6, a drive circuit 7, a motor 8, a reducer 9, a cover 10, a sensing window 11, and a sensing area 12. The control manner of the digital-display control apparatus of a garbage can with adjustable sensing distance is an active infrared sensing manner. The analog to digital converter 41, the analog to digital conversion result register 42, the adjustable sensing distance register 44, the comparison unit 43, and the microcomputer control unit 45 are integrated in the microcomputer control chip 4. The microcomputer control chip 4 comprises a first port 4A, a second port 4B, a third port 4C, a fourth port 4D, and a fifth port 4E. The first port 4A is connected to the infrared emitter 1. The second port 4B is connected to the output of the amplifier 3. The third port 4C is connected to the digital displayer 5. The fourth port 4D is connected to the drive circuit 7. The fifth port 4E is connected to the key 6. The drive circuit 7 is connected to the cover 10 via the motor 8 and the reducer 9 in order, so as to drive the cover 10 to open or close. The infrared receiver 2 is connected to the comparison unit 43 via the amplifier 3, the analog to digital converter 41, and the analog to digital conversion result register 42 in order. The comparison unit 43 is also connected to the adjustable sensing distance register 44.

In this embodiment, the sensing distance can be adjusted in 5 levels as an example. The digital displayer 5 displays number 1 to 5, corresponding to level 1 to level 5 respectively. When displaying number "1", the sensing distance is 10 cm. When displaying number "2", the sensing distance is 20 cm. When displaying number "3", the sensing distance is 30 cm. When displaying number "4", the sensing distance is 40 cm. When displaying number "5", the sensing distance is 50 cm. When the microcomputer control chip is powered on, the default sensing distance is 30 cm. In the standby mode, the program scans whether the key 6 is pressed. If the key 6 is not pressed, the sensing distance is remained at the default value of 30 cm. If the key 6 is pressed, the digital displayer 5 displays the current value as number "3". After each keystroke of the key 6, the digital displayer displays the number plus 1. When the maximum sensing distance is reached at level 5, press the key again to display the number to back to level 1 so as to repeat the above cycle. If pressing to a particular level and not pressing key 6 again, the number displays for 2 seconds and go out (for the purpose of saving power). The sensing distance value corresponding to this level will be assigned by the display digital table-look-up program (that is, selected from the microcomputer control unit and assigned to the adjustable sensing distance register 44) to complete the adjustment. Then, the comparison unit 43 triggers whether the cover 10 is open by comparing the current value of the analog to digital conversion result register 42 with the sensing distance value in the adjustable sensing distance register 44. If the current value of the analog to digital conversion result register 42 is less than the sensing distance value in the adjustable sensing distance register 44, the cover 7 is not opened. If the current value of the analog to digital conversion result register 42 is larger than the sensing distance value in the adjustable sensing distance register 44, the cover 7 is opened. The greater the distance between the obstacle and the sensing window 11, the smaller the reflected signal is. The closer the distance between the obstacle and the sensing window 11, the larger the reflected signal is. And, the farther the sensing distance is adjusted, the smaller the reflected signal will be.

The electrical block diagram of the connection between the digital displayer 5 and the microcomputer control chip 4 of this embodiment is shown in FIG. 2. The digital displayer 5 is embodied as an LED seven-segment digital displayer, and that the 7 pins of the LED seven-segment digital displayer are respectively connected to ports 4C1 to 4C7 of the microcomputer control chip 4 via the current limiting resistor R1~R7, wherein the digital displayer 5 is installed under the sensing window.

One skilled in the art will understand that the embodiment of the present invention as shown in the drawings and described above is exemplary only and not intended to be limiting.

The embodiments have been shown and described for the purposes of illustrating the functional and structural principles of the present invention and is subject to change without departure from such principles.

What is claimed is:

1. A digital-display control apparatus for garbage can with adjustable sensing distance, comprising:
   an emitter;
   a receiver;
   an amplifier;
   an analog to digital converter;
   an analog to digital conversion result register connected to the receiver via the amplifier and the analog to digital converter;
   a comparison unit;
   an adjustable sensing distance register;
   a microcomputer control unit, wherein outputs of the analog to digital conversion result register and the adjustable sensing distance register are respectively connected to the comparison unit, wherein control ports of the microcomputer control unit are respectively connected with the analog to digital conversion result register, the comparison unit, the adjustable sensing distance register, and the emitter;
   a drive circuit, wherein one output of the microcomputer control unit is connected to the drive circuit;
   a digital displayer; and
   at least one key, wherein an input of the at least one key is connected with the microcomputer control unit, wherein an output of the microcomputer control unit is connected to the digital displayer, wherein a signal input by the at least one key is processed by the microcomputer control unit, and a sensing distance value is obtained as a register value of the adjustable sensing distance register, wherein one of the sensing distance value and a digital information representing the sensing distance value is outputted to the digital displayer by the microcomputer control unit for display.

2. The digital-display control apparatus, as recited in claim 1, wherein the at least one key is a number input key directly inputting a value converted and processed by the microcomputer control unit, and then being stored in the adjustable sensing distance register.

3. The digital-display control apparatus, as recited in claim 2, wherein the digital displayer is a number display displaying number 1 to number N, wherein 2≤N≤9.

4. The digital-display control apparatus, as recited in claim 3, wherein the number 1 representing that the sensing distance value is 10 cm, wherein number 2 representing that the sensing distance value is 20 cm, wherein number 3 representing that the sensing distance value is 30 cm, wherein the number 4 representing that the sensing distance value is 40 cm, wherein the numbers 5 representing that the sensing distance value is 50 cm, wherein number 6 representing that sensing distance value is 60 cm, wherein number 7 representing that sensing distance is 70 cm, wherein number 8 representing that sensing distance value is 80 cm, wherein number 9 representing that sensing distance value is 90 cm.

5. The digital-display control apparatus, as recited in claim 1, wherein the at least one key is a selection input key, wherein the adjustable sensing distance register comprises a plurality of storage units for storing a predetermined distance value.

6. The digital-display control apparatus, as recited in claim 5, wherein the digital displayer is a number display displaying number 1 to number N, wherein 2≤N≤9.

7. The digital-display control apparatus, as recited in claim 6, wherein the number 1 representing that the sensing distance value is 10 cm, wherein number 2 representing that the sensing distance value is 20 cm, wherein the number 3 representing that the sensing distance value is 30 cm, wherein the number 4 representing that the sensing distance value is 40 cm, wherein the numbers 5 representing that the sensing distance value is 50 cm, wherein number 6 representing that sensing distance value is 60 cm, wherein number 7 representing that sensing distance is 70 cm, wherein number 8 representing that sensing distance value is 80 cm, wherein number 9 representing that sensing distance value is 90 cm.

8. The digital-display control apparatus, as recited in claim 1, wherein the analog to digital converter, the analog to digital conversion result register, the sensing distance adjustable register, the comparison unit, and the microcomputer control unit are integrated in one microcomputer control chip, wherein the microcomputer control chip comprises a first port 4A, a second port 4B, a third port 4C, a fourth port 4D, and a fifth port 4E, wherein the first port 4A is connected to the emitter, wherein the second port 4B is connected to the output of the amplifier, wherein the third port 4C is connected to the digital displayer, wherein the fourth port 4D is connected to the drive circuit, wherein the fifth port 4E is connected to the at least one key.

9. The digital-display control apparatus, as recited in claim 8, wherein the digital displayer is a number display displaying number 1 to number N, wherein 2≤N≤9.

10. The digital-display control apparatus, as recited in claim 9, wherein the number 1 representing that the sensing distance value is 10 cm, wherein number 2 representing that the sensing distance value is 20 cm, wherein number 3 representing that the sensing distance value is 30 cm, wherein number 4 representing that the sensing distance value is 40 cm, wherein numbers 5 representing that the sensing distance value is 50 cm, wherein number 6 representing that sensing distance value is 60 cm, wherein number 7 representing that sensing distance is 70 cm, wherein number 8 representing that sensing distance value is 80 cm, wherein number 9 representing that sensing distance value is 90 cm.

11. The digital-display control apparatus, as recited in claim 1, wherein the digital displayer is a number display displaying number of 1 to number N, wherein 2≤N≤9.

12. The digital-display control apparatus, as recited in claim 5, wherein the number 1 representing that the sensing distance value is 10 cm, wherein number 2 representing that the sensing distance value is 20 cm, wherein number 3 representing that the sensing distance value is 30 cm, wherein number 4 representing that the sensing distance value is 40 cm, wherein numbers 5 representing that the sensing distance value is 50 cm, wherein number 6 representing that sensing distance value is 60 cm, wherein number 7 representing that sensing distance is 70 cm, wherein number 8 representing that sensing distance value is 80 cm, wherein number 9 representing that sensing distance value is 90 cm.

13. The digital-display control apparatus, as recited in claim 1, wherein the at least one key is a selection input key, wherein the microcomputer control unit is stored with a plurality of predetermined distance value, so that while operating the at least one key, the sensing distance value is able to be selected correspondingly by a corresponding content or the times of keystrokes.

14. A garbage can, comprising:
a can; and
a digital-display control apparatus provided on the can having an adjustable sensing distance, wherein the digital-display control apparatus comprises:
an emitter;
a receiver;
an amplifier;
an analog to digital converter;
an analog to digital conversion result register connected to the receiver via the amplifier and the analog to digital converter;
a comparison unit;
an adjustable sensing distance register;
a microcomputer control unit, wherein outputs of the analog to digital conversion result register and the adjustable sensing distance register are respectively connected to the comparison unit, wherein control ports of the microcomputer control unit are respectively connected with the analog to digital conversion result register, the comparison unit, the adjustable sensing distance register, and the emitter;
a drive circuit, wherein one output of the microcomputer control unit is connected to the drive circuit;
a digital displayer; and
at least one key, wherein an input of the at least one key is connected with the microcomputer control unit, wherein an output of the microcomputer control unit is connected to the digital displayer, wherein the a signal input by the at least one key is processed by the microcomputer control unit, and a sensing distance value is obtained as a register value of the adjustable sensing distance register, wherein one of the sensing distance value and a digital information representing the sensing distance value is outputted to the digital displayer by the microcomputer control unit for display.

15. The garbage can, as recited in claim 14, wherein the at least one key is selected from a group consisting of a number input key and a selection input key, wherein when the at least one key is a number input key, the number input key is capable of directly inputting a value converted and processed by the microcomputer control unit, and then being stored in the sensing distance adjustable register, wherein when the at least one key is a selection input key, the adjustable sensing distance register comprises a plurality of storage units for storing a predetermined distance value, or the microcomputer control unit is stored with a plurality of predetermined distance value, so that while operating the at least one key, the sensing distance value is able to be selected correspondingly by a corresponding content or the times of keystrokes.

16. The garbage can, as recited in claim 15, wherein the digital displayer is a number display displaying number 1 to number N, wherein 2≤N≤9, wherein the number 1 representing that the sensing distance value is 10 cm, wherein number 2 representing that the sensing distance value is 20 cm, wherein number 3 representing that the sensing distance value is 30 cm, wherein number 4 representing that the sensing distance value is 40 cm, wherein numbers 5 representing that the sensing distance value is 50 cm, wherein number 6 representing that sensing distance value is 60 cm, wherein number 7 representing that sensing distance is 70 cm, wherein number 8 representing that sensing distance value is 80 cm, wherein number 9 representing that sensing distance value is 90 cm.

17. The garbage can, as recited in claim 14, wherein the analog to digital converter, the analog to digital conversion result register, the sensing distance adjustable register, the comparison unit, and the microcomputer control unit are integrated in one microcomputer control chip, wherein the microcomputer control chip comprises a first port 4A, a second port 4B, and a third port 4C, a fourth port 4D, and a fifth port 4E, wherein the first port 4A is connected to the emitter, wherein the second port 4B is connected to the output of the amplifier, wherein the third port 4C is connected to the digital displayer, wherein the fourth port 4D is connected to the drive circuit, wherein the fifth port 4E is connected to the at least one key.

18. The garbage can, as recited in claim 14, wherein the digital displayer is a number display displaying number 1 to number N, wherein 2≤N≤9.

19. The garbage can, as recited in claim 18, wherein the number 1 representing that the sensing distance value is 10 cm, wherein number 2 representing that the sensing distance value is 20 cm, wherein number 3 representing that the sensing distance value is 30 cm, wherein number 4 representing that the sensing distance value is 40 cm, wherein numbers 5 representing that the sensing distance value is 50 cm, wherein number 6 representing that sensing distance value is 60 cm, wherein number 7 representing that sensing distance is 70 cm, wherein number 8 representing that sensing distance value is 80 cm, wherein number 9 representing that sensing distance value is 90 cm.

* * * * *